United States Patent [19]

Yamashina et al.

[11] Patent Number: 5,758,282

[45] Date of Patent: May 26, 1998

[54] RADIO TERMINAL USING ALLOCATED ADDRESSES

[75] Inventors: Kenji Yamashina, Nara; Susumu Kitaguchi, Toyonaka, both of Japan

[73] Assignee: Sharp Kabushiki Kaisha, Osaka, Japan

[21] Appl. No.: 666,660

[22] Filed: Jun. 18, 1996

[30] Foreign Application Priority Data

Jun. 19, 1995 [JP] Japan ................................. 7-151687

[51] Int. Cl.⁶ ...................................................... H04B 1/00
[52] U.S. Cl. .......................... 455/428; 455/450; 455/445; 455/464; 455/509; 370/437
[58] Field of Search ................................ 455/428, 445, 455/450–452, 464, 509; 370/416, 437, 418, 237

[56] References Cited

U.S. PATENT DOCUMENTS

| | | | |
|---|---|---|---|
| 4,899,274 | 2/1990 | Hansen et al. | 364/229.1 |
| 5,251,205 | 10/1993 | Callon et al. | 370/94.1 |
| 5,276,442 | 1/1994 | Cree et al. | 340/825.52 |
| 5,504,743 | 4/1996 | Drefenstedt | 370/94.1 |

OTHER PUBLICATIONS

Inside AppleTalk, Second Edition by G.S. Sidhu et al., Addison–Wesley Publishing Company, Inc., Jun. 1996.

*Primary Examiner*—Donnie L. Crosland
*Attorney, Agent, or Firm*—David C. Conlin; William J. Daley, Jr.

[57] ABSTRACT

Each radio terminal monitors generation of address conflict between terminals including the terminal of interest by referring to epoch numbers and addresses of other terminals registered in a history table and an address table in a data memory of a radio LAN adapter of the terminal of interest during data communication of a host computer. When conflict is generated, the terminal of interest resolves the conflict by requesting the communicating terminal to update the address and receiving the updated address. Communication protocol and software for address allocation are stored in a program memory and carried out by a microcontroller. Communication with other terminals is carried out through an antenna, a radio transceiver, and a radio interface.

11 Claims, 13 Drawing Sheets

| ADDRESS | EPOCH NUMBER | CONFLICT FLAG | TIME OF LAST UPDATE | |
|---|---|---|---|---|
| ADDRESS OF TERMINAL B | EPOCH NUMBER OF TERMINAL B | 1 | xx:xx:xx | 1102 |
| ADDRESS OF TERMINAL C | EPOCH NUMBER OF TERMINAL C | 1 | yy:yy:yy | 1104 |
| — | — | — | — | |

1110

RADIO TERMINAL USING ALLOCATED ADDRESSES

BACKGROUND OF THE INVENTION

1. Field of the Invention

The present invention relates to radio terminals and address allocation methods thereof and, more particularly, to an address allocation method capable of resolving conflict of addresses of respective terminals in the radio network, and a radio terminal using the same.

2. Description of the Background Art

An address of a terminal connected to a local area network is required to indicate destination of a packet exchanged between terminals and to be allocated to the terminal to avoid conflict.

Such address allocation methods include a method of fixedly allocating addresses managed throughout the network such as internet employing TCP/IP protocol and a method in which a terminal does not hold a preallocated address but dynamically gains an address.

The latter method of dynamically allocating addresses further includes a method in which a terminal gains an unused free address from a management terminal on the network controlling address resources and an address allocation method of distribution type in which such management terminal does not exist and each terminal seeks a free address on the network to gain an address.

As address allocation protocol of distribution type, AppleTalk protocol of Apple Computer, Inc. operating on the cable network is widely known. In AppleTalk protocol, dynamic allocation of addresses is achieved in AppleTalk Address Resolution Protocol (AARP).

FIG. 15 shows operation of AARP representing conventional method of dynamic address allocation in the cable network.

In accordance with AARP, two kinds of packets, AARP probe packet and AARP response packet, are used for dynamically determining addresses without conflict at all nodes.

Referring to FIG. 15, first, terminal A trying to determine an address generates a temporary address X by a random number and transmits an AARP probe packet including this address to the network (#1402). This AARP probe packet is received by all the other address terminals connected to the same network. The terminal which has received the AARP probe packet compares the temporary address X included in the AARP probe packet and its own address. If a terminal B detects that the temporary address and its own address are the same X, it sends back an AARP response packet to terminal A (#1404). When terminal A which has transmitted the AARP probe packet receives the AARP response packet from terminal B, it means that the set temporary address X has been already used in the network. As a result, terminal A resets a new temporary address Y and transmits an AARP probe packet to the network (#1406).

If terminal A which has transmitted an AARP probe packet does not receive an AARP response packet for a prescribed time period, the terminal further transmits the AARP probe packet a prescribed number of times and monitors reception of an AARP response packet (#1408). If it does not receive an AARP response packet, terminal A determines that the set temporary address Y is unused in the network and gains temporary address Y as the address of terminal A.

The number of times an AARP probe packet is transmitted is changed in accordance with the extent the terminal trying to gain an address requires uniqueness of the address.

Thus, in accordance with AARP protocol, a temporary address is generated with use of a random number and the temporary address is not used as the address for the terminal of interest until the address is validated as an unused free address. Details of AppleTalk Protocol of Apple Computer, Inc. is described in, for example, *Inside AppleTalk*, Second Edition (Gursharan S. Sidhu, Richard F. Andrews, Alan B. Oppenhimer, Apple Computer, Inc.).

However, if such address allocation method of distribution type in the cable network as described above is applied to a radio local area network (hereinafter referred to as a radio network), an AARP probe packet for enquiring address conflict to the other terminals may not reach all the other terminals due to limitation of communication distance, fluctuation in electric waves over time, and movement of terminals.

Therefore, if a terminal trying to gain an address does not receive an AARP response packet as a response to transmission of an AARP probe packet, it does not mean that the address is guaranteed as a free address which is not used by the other terminals, leading to possibility of generating address conflict due to movement of terminals and change in radio environments thereafter.

SUMMARY OF THE INVENTION

Therefore, an object of the present invention is to achieve address allocation without address conflict between terminals in a radio network.

Another object of the present invention is to resolve address conflict between terminals, if any, in a radio network.

Still another object of the present invention is to provide a radio terminal capable of allocating addressees without address conflict between terminals in a radio network.

A further object of the present invention is to provide a radio terminal capable of resolving address conflict between terminals, if any.

A further object of the present invention is to provide an address allocation method capable of allocating addresses without address conflict between terminals.

A further object of the present invention is to provide an address allocation method capable of resolving address conflict between terminals, if any.

The above objects of the present invention are achieved by an address allocation method including the following elements. More specifically, the address allocation method according to the present invention includes, in each radio terminal, the steps of setting a first identifier of a terminal of interest, receiving a pair of first and second identifiers of a communicating terminal during communication, comparing the pair of first and second identifiers of the communicating terminal with a pair of first and second identifiers of the terminal of interest and a pair of first and second identifiers of another terminal already held in the terminal of interest, detecting conflict of the first identifiers between the compared pairs of the first and second identifiers, and resetting the first identifier, for which conflict is detected, of either one terminal.

In the address allocation method according to the present invention, in each radio terminal, a first identifier of a terminal of interest is set, a pair of first and second identifiers of a communicating terminal is received therefrom during communication, the pair of first and second identifiers of the communicating terminals is compared with a pair of first and second identifiers of the terminal of interest and a pair of first and second identifiers of another terminal already held in the terminal of interest, conflict of the first identifiers is detected between the compared pairs of first and second identifiers, and the first identifier, for which conflict is detected, of either one terminal is reset. As a result, conflict of the first identifiers can be detected and resolved with use of the second identifiers during communication between radio terminals subjected to limitation of communication distance, fluctuation in electric waves over time, and movement of the terminals.

According to another aspect of the present invention, the radio terminal is used in a radio network and has changeable first and second identifiers. The terminal includes a first setting unit for setting a first identifier of the terminal of interest, a first receiver for receiving first and second identifiers of a communicating terminal therefrom during communication, a first comparator for comparing the pair of first and second identifiers of the communicating terminal received by the first receiver with a pair of first and second identifiers of the terminal of interest and a pair of first and second identifiers of another terminal already held in the terminal of interest, a first detector for detecting conflict of the first identifiers between the pairs of first and second identifiers compared by the first comparator, and a resetting unit for resetting the first identifier, for which conflict is detected by the first detector, of either one terminal.

In the radio terminal according to the above-described another aspect of the present invention, the first identifier of the terminal of interest is set. The pair of first and second identifiers of the communicating terminal is received therefrom during communication, and the received pair of first and second identifiers of the communicating terminal is compared with a pair of first and second identifiers of the terminal of interest and a pair of first and second identifiers of another terminal already held in the terminal of interest. Conflict of the first identifiers is detected between the compared pairs of first and second identifiers, and the first identifier, for which conflict is detected, of either one terminal is reset. As a result, conflict of the first identifiers can be detected and resolved with use of the second identifiers during communication between radio terminals subjected to limitation of communication distance, fluctuation in electric waves over time, and movement of the terminals.

According to still another aspect of the present invention, the radio network has a plurality of radio terminals with changeable first and second identifiers. Each radio terminal includes a first setting unit for setting a first identifier of the terminal of interest, a first informing unit for informing during communication a communicating terminal of a pair of first and second identifiers of the terminal of interest and a pair of first and second identifiers of another terminal already held as a result of past communication by the terminal of interest, a first receiver for receiving a pair of first and second identifiers of the communicating terminal during communication, a first memory for storing and holding the received first identifier of the communicating terminal, a second memory for storing and holding the received second identifier of the communicating terminal, a first comparator for comparing the received pair of first and second identifiers of the communicating terminal with the pair of first and second identifiers of the terminal of interest and the pair of first and second identifiers of another terminal already held in the terminal of interest, a first detector for detecting conflict of the first identifiers between the pairs of first and second identifiers compared by the first comparator, and a first resetting unit for resetting the first identifier, for which conflict is detected by the first detector, of either one terminal.

In the radio network, in each radio terminal, a first identifier of a terminal of interest is set. During communication, a communicating terminal is informed of a pair of first and second identifiers of the terminal of interest. A pair of first and second identifiers of the communicating terminal is received therefrom during communication. The received first identifier of the communicating terminal is stored and held, and the received second identifier of the communicating terminal is stored and held. The received pair of first and second identifiers of the communicating terminal is compared with the pair of first and second identifiers of the terminal of interest and a pair of first and second identifiers of another terminal already held in the terminal of interest. Conflict of the first identifiers is detected between the compared pairs of first and second identifiers, and the first identifier, for which conflict is detected, of either one terminal is reset. Consequently, between radio terminals subjected to limitation of communication distance, fluctuation in electric waves over time, movement of the terminal, conflict of the first identifiers can be detected and resolved with use of the second identifiers. Information on the pair of first and second identifiers of another terminal held by the terminal of interest is added and held at the communicating terminal, and information of a pair of first and second identifiers of another terminal held by the communicating terminal is added and held at the terminal of interest, thereby facilitating and ensuring resolution of conflict of the first identifiers.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the present invention will be described below with reference to the drawings.

[First Embodiment]

Figure 1:
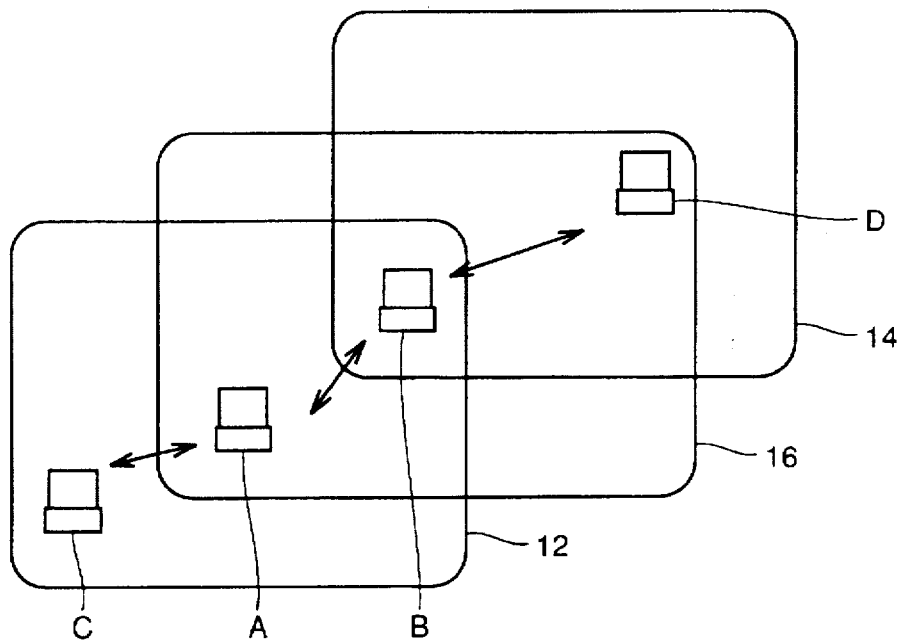
FIG. 1 shows an example of the environment for a general radio local area network including radio terminals in accordance with an embodiment of the present invention.

FIG. 1 shows an example of the environment of a general radio local area network including a radio terminal according to an embodiment of the present invention.

Referring to FIG. 1, the radio local area network includes radio terminals A, B, C and D.

The radio terminals are portable terminals with radio communication capabilities such as hand-held computer and a POS terminal.

Each radio terminal sets a temporary address of its own with use of random numbers. After the temporary address is set, each terminal initiates communicating operation and monitors address conflict between another terminal and itself (local conflict) and address conflict between two or more other terminals (remote conflict) during communication.

Local conflict can be easily detected by comparing an address from which a received packet is transmitted (sender's address) and the address of the terminal of interest. Remote conflict can be detected by adding an identifier (epoch number) inherent to each terminal for distinguishing from other terminals to a packet and holding and referencing a table (address table) for storing and managing a pair of the epoch number and the sender's address obtained from the received packet at each terminal. More specifically, if the address same as the sender's address of the received packet is already stored in the address table and their epoch numbers are different, the terminal which has sent the received packet is different from the terminal identified by the pair of the epoch number and the address stored in the address table, determined as generation of remote conflict between these terminals.

The terminal which has detected local conflict changes the address of its own to resolve address conflict and transmits an address advertisement packet (hereinafter referred to as an advertisement packet) including the changed address to other terminals.

When remote conflict is detected, a packet requesting the terminal to change its address is transmitted, and the terminal which has received the request transmits a packet including an updated address to other terminals as a response.

As an epoch number, an MAC address, a manufacturing number, and the like allowing unique identification of terminals can be used, and one that can distinguish between a plurality of different terminals existing in a communicable range can also be used. The epoch number is set by, for example, user's input of a manufacturing number allowing identification of the terminal to the equipment, or by writing the number or the like into a non-volatile memory 32 shown in FIG. 2 at the manufacturing step described later.

The areas in which terminals A, D and B can communicate are indicted by areas 12, 14, and 16, respectively. It is assumed that terminals B and C are at such a distance that they cannot communicate with each other.

Now, operation of the radio terminal according to the present invention in the radio environment shown in FIG. 1 will be described as a specific example.

Figure 2:
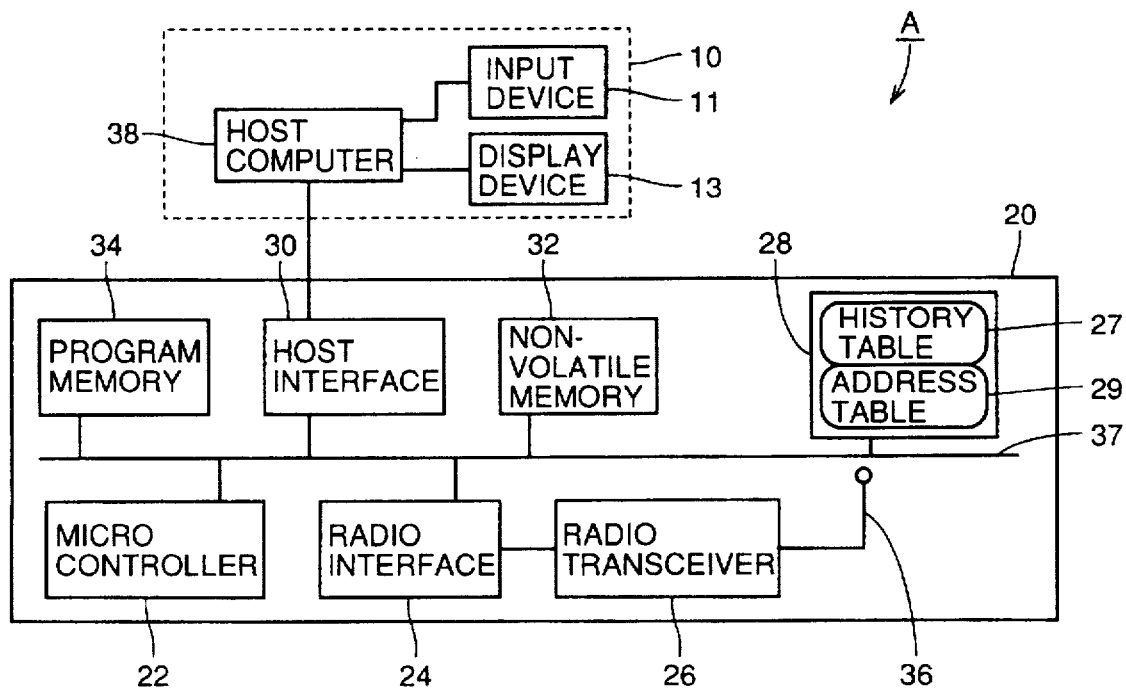
FIG. 2 is a block diagram showing in detail the structure of terminals A, B, C and D in FIG. 1.

FIG. 2 is a block diagram showing in detail the structure of terminals A, B, C and D shown in FIG. 1. Terminals B, C, and D have the structure similar to that of terminal A.

Referring to FIG. 2, terminal A includes a main body 10 and a radio LAN adaptor 20. The radio terminal according to the present invention achieves address allocation by the software and communicating protocol therefor packaged in radio LAN adaptor 20.

Main body 10 includes a host computer 38, an input device 11 for input of data, command and the like to the host computer, and a display device 13 for displaying data.

Radio LAN adaptor 20 includes a program memory 34 for storing the software for address allocation and communication protocol, a microcontroller 22 for implementing the software and the protocol, a data memory 28 at which microcontroller 22 temporarily holds data, non-volatile memory 32 for holding data substantially permanently, an antenna 36, a radio transceiver 26 for transmitting/receiving a packet to/from the radio network, a radio interface 24 for interfacing radio transceiver 26 and data memory 28, and a host interface 30 for interfacing with host computer 38 in main body 10.

Data memory 28 holds a history table 27 and an address table 29 described later.

In main body 10, input device 11 and display device 13 are connected to host computer 38.

Microcontroller 22, radio interface 24, data memory 28, host interface 30, non-volatile memory 32, and program memory 34 are interconnected with a local bus 37 in radio LAN adapter 20. Antenna 36 is connected to radio transceiver 26, which in turn is connected to radio interface 24.

A packet is transmitted/received to/from the radio network through radio interface 24, radio transceiver 26 and antenna 36. Radio interface 24 transmits the packet data written to data memory 28 by microcontroller 22 to radio transceiver 26 in a serial manner. The packet data received from the radio network is transmitted to radio interface 24 by radio transceiver 26, and written to data memory 28 in a parallel manner. Addition, deletion and update of the information obtained from the packet received at the radio network is carried out at data memory 28 by microcontroller 22.

In accordance with the data and command applied to input device 11, data written to data memory 28 is transmitted to host computer 38 through host interface 30 and displayed by display device 13 as characters and visual images.

Figure 3:
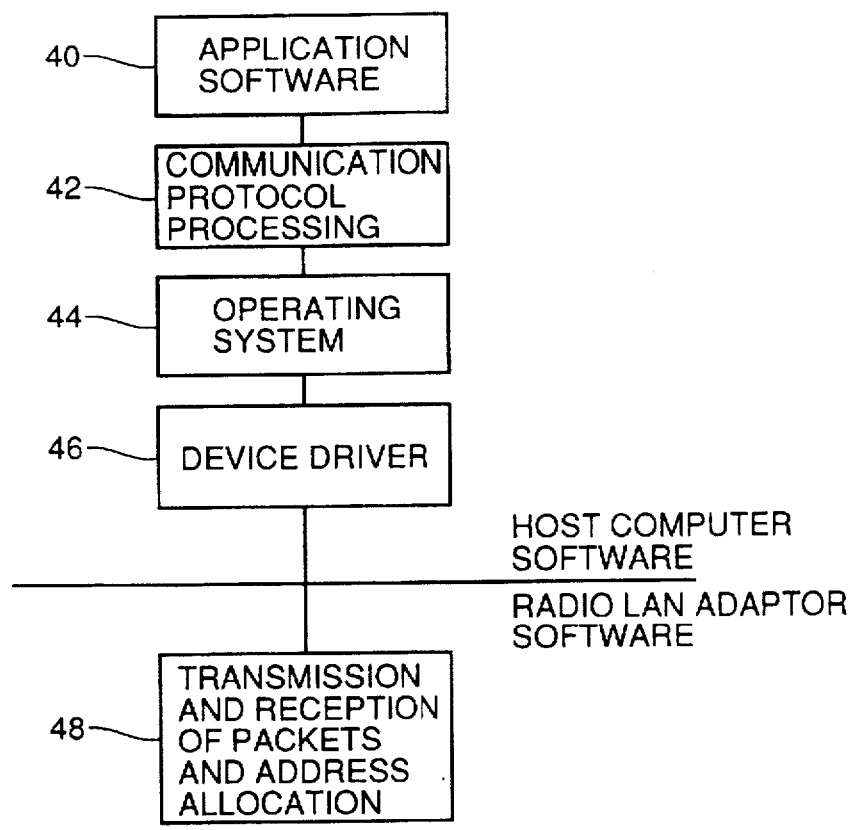
FIG. 3 is a block diagram showing the structure of the software of terminals A, B, C and D in FIG. 1.

FIG. 3 is a block diagram showing the structure of the software of terminals A, B, C and D. Referring to FIG. 3, the software of terminals A, B, C and D include blocks 40, 42, 44, 46 and 48.

Block 48 is packaged in radio LAN adaptor 20 shown in FIG. 2 and used for transmission and reception of a packet and allocation of addresses. Blocks 40, 42, 44 and 46 are packaged in host computer 38 shown in FIG. 2. Block 42 deals with communication protocol for validation of transmission and retransmission of a packet. Block 40 is an application program employing communication service of block 42. Block 44 is operating system for peripheral devices (such as a personal computer disk and a key board) of a terminal. Block 46 is a device driver for transmission and reception of data between blocks 44 and 48.

Figure 4:
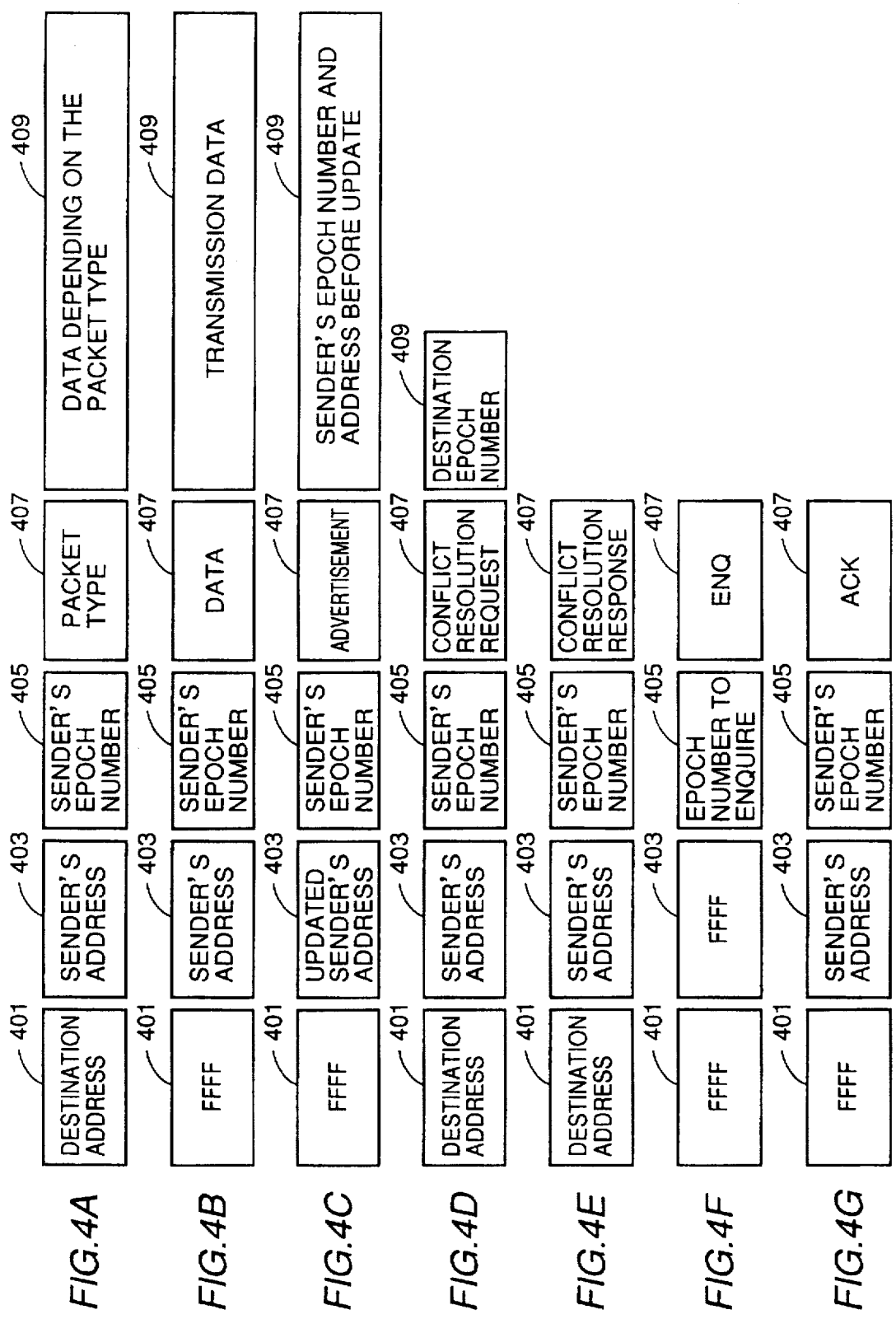
FIGS. 4A–AG show simplified formats of packets used by the radio terminal in accordance with the embodiment of the present invention.

FIGS. 4A–4G show simplified formats of packets used by the radio terminal according to the embodiment of the present invention. FIG. 4A shows a general format, FIG. 4B shows a format of a data packet (packet of the transmission data itself), FIG. 4C shows a format of an advertisement packet, FIG. 4D shows a format of a conflict resolution request packet, FIG. 4E shows a format of a conflict resolution response packet, FIG. 4F shows a format of an ENQ packet, and FIG. 4G shows a format of an ACK packet.

The general format shown in FIG. 4A includes a destination address 401, a sender's address 403, a sender's epoch number 405, and a packet type 407 indicating the type of the packet, and may also include a certain data 409 depending on the type of packet.

Respective formats shown in FIGS. 4A–4G employ the general format shown in FIG. 4A as a basic form.

The format of the data packet shown in FIG. 4B has destination address 401 "FFFF" indicating a broadcast address. Packet type 407 indicates that this packet is a data packet. Data 409 indicates the data itself transmitted between terminals.

Each terminal generates a random number to select a temporary address, compares the temporary address with addresses of other terminals stored in the address table described later, and sets the address which does not conflict with these addresses as an address of its own. After the address is set, the terminal initiates communication and detects address conflict, and resolves the conflict if detected.

Address conflict includes local conflict in which the address of a terminal of interest conflicts an address of another terminal, and remote conflict in which a plurality of other terminals employ the same address.

Local conflict can be easily detected by comparing the sender's address of the received packet and the address of the terminal of interest. The terminal which has detected local conflict resets the address of its own and informs other terminals of a newly set address with an address advertisement packet.

Figure 5:
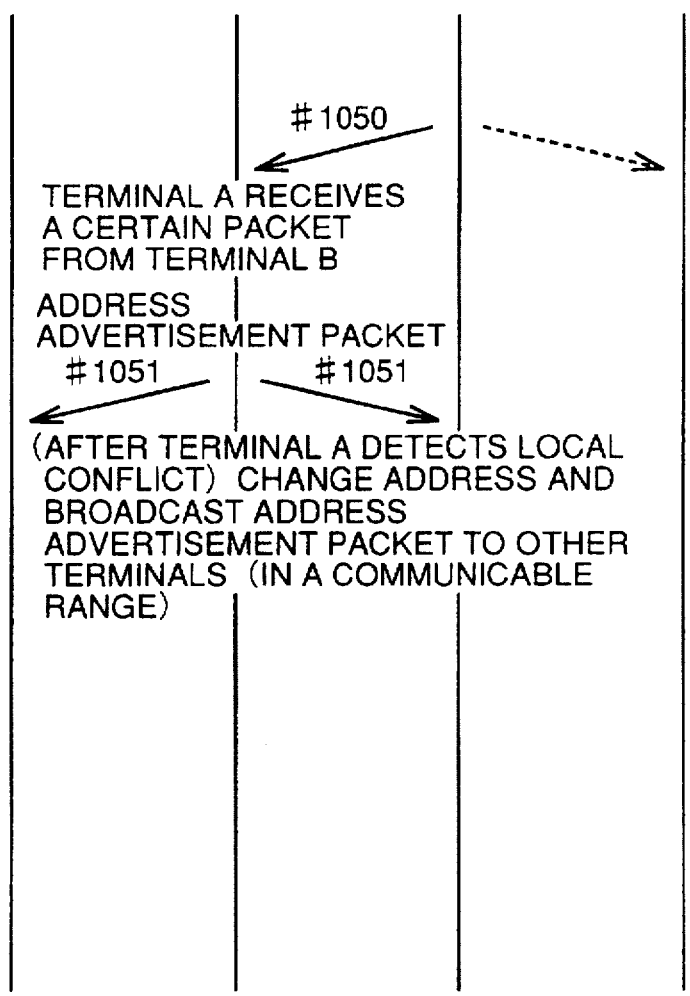
FIG. 5 shows a process for resolving local conflict between terminals A and B in accordance with a first embodiment of the present invention.

FIG. 5 shows the process for resolving local conflict between terminals A and B in accordance with the first embodiment of the present invention.

Figure 6:
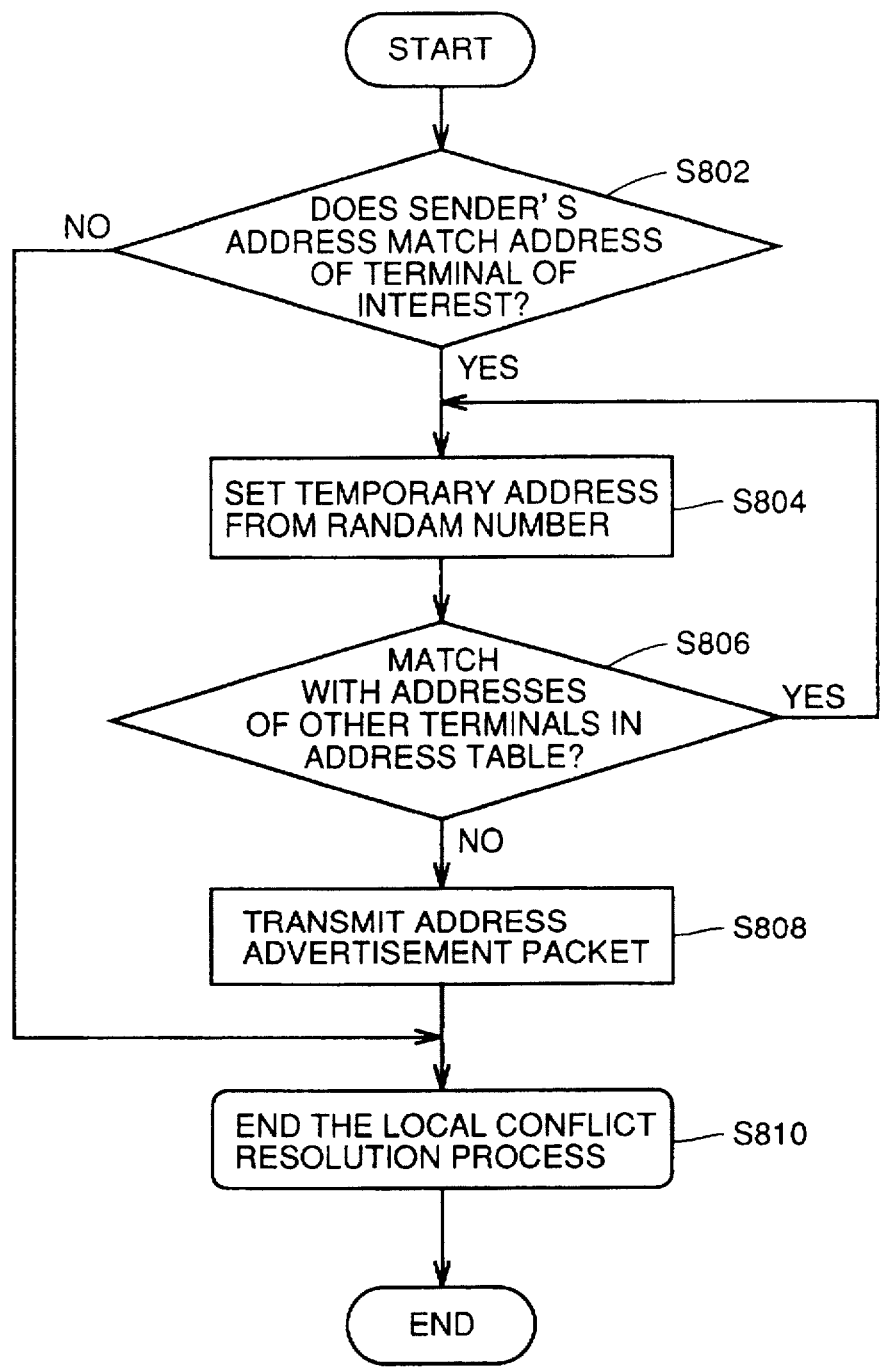
FIG. 6 is a flow chart showing a process for resolving local conflict between radio terminals in accordance with the first embodiment of the present invention.

FIG. 6 is a flow chart showing the process for resolving local conflict. The description will be made of the process for resolving local conflict shown in FIG. 5 with reference to the flow chart shown in FIG. 6.

Referring to FIG. 5, when terminal A receives a certain packet transmitted by terminal B as shown by #1050, terminal A determines whether or not the address of terminal B which has transmitted the received packet (sender's address) matches with the address of its own (step S802 (the word "step" will be omitted hereinafter)). If it is determined that the address does not match therewith, local conflict is not generated, terminating the process for resolving local conflict (S810). If it is determined that the addresses match (S802), a temporary address of the terminal of interest is set by a random number (S804). Determination is made as to whether the set temporary address matches with the addresses of other terminals in the address table (S806). If match of the addresses is determined, another temporary address is set (S808). If no match of the addresses is determined, an address advertisement packet is transmitted to other terminals (S808) as shown by #1051, terminating the process for resolving local conflict (S810).

Referring to FIG. 4C, the format of the advertisement packet has destination address 401 "FFFF" indicating a broadcast address. Sender's address 403 indicates the reset address (after update). Packet type 407 indicates that this packet is an advertisement packet. Data 409 indicates the address before reset (before update) and the epoch number.

Remote conflict can be detected by conflicting addresses in registering the address of the sending terminal (sender's address) included in the received packet in the address table of the terminal of interest.

Each terminal registers the epoch number and the sender's address of the received packet in the address table during operation.

Since the number of addresses stored in the address table is finite, the address table is formed using the algorithm known generally as a caching mechanism to remove such limitation. In accordance with the cashing mechanism, if there is no empty region for adding a new element to the table, an already stored element of less importance is deleted from the table to secure the region for storing a new element.

For example, the address table described above can be formed by adding to the table the time when each element of the table is added or referenced and deleting the oldest element.

Figure 7:
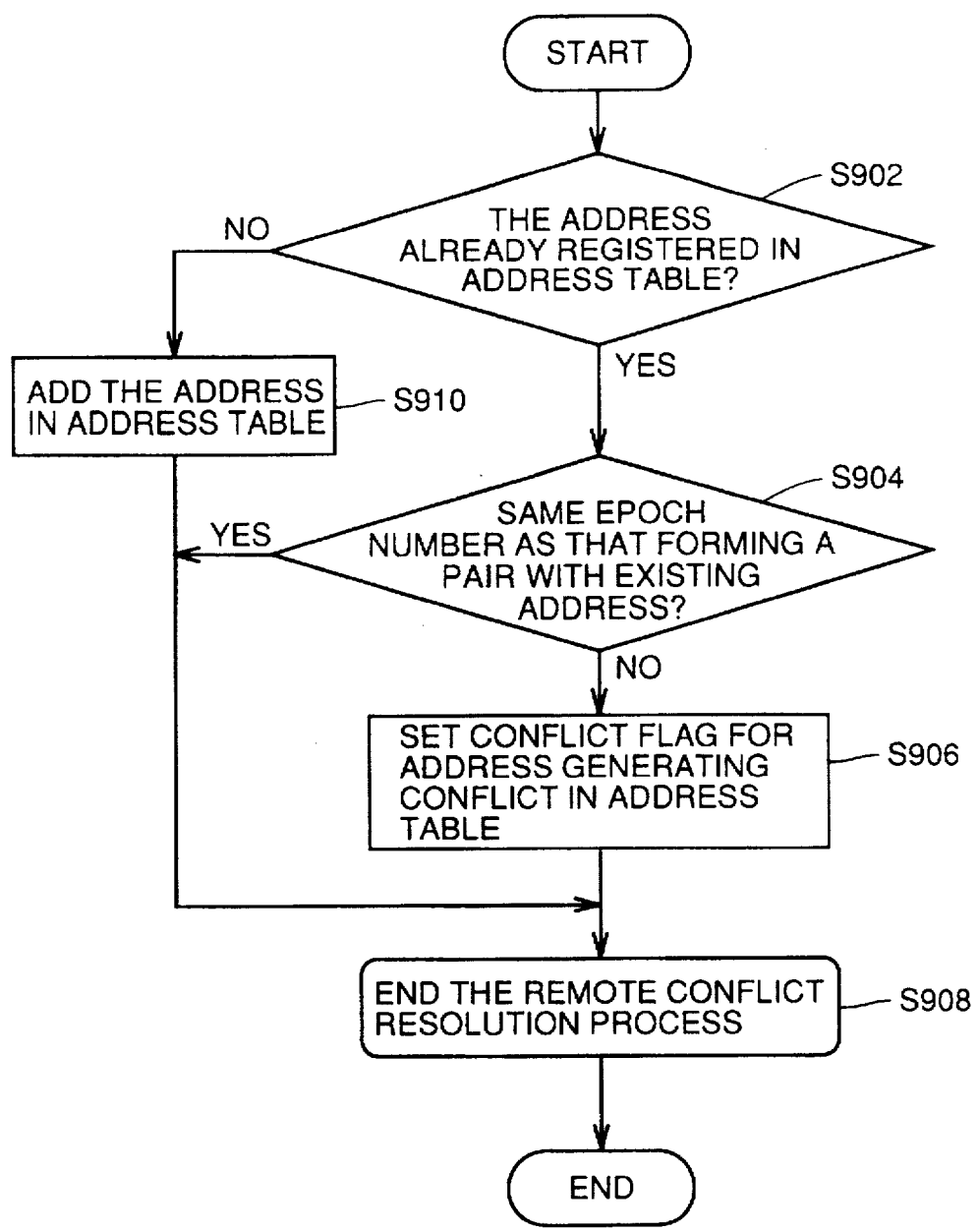
FIG. 7 is a flow chart showing a process for resolving remote conflict related to a received packet of the radio terminal in accordance with the first embodiment of the present invention.

FIG. 7 is a flow chart showing the process for resolving remote conflict related to a received packet.

Referring to FIG. 7, determination is made at S902 as to whether the sender's address of a received packet is the address already registered in the address table of the terminal of interest. If it is determined that the address is not registered in the address table, the sender's address is added to the address table at S910 and the process for resolving remote conflict is terminated at S908.

If it is determined at S902 that the address same as the sender's address is registered in the address table, determination is made at S904 as to whether the registered epoch number forming a pair with the already registered address is the same as the epoch number forming a pair with the sender's address. If it is determined as the same epoch number, the terminals are determined as the same and the process for resolving remote conflict is terminated at S908.

If it is determined at S904 that the epoch numbers are not the same, a conflict flag is set for the address generating conflict in the address table at S906. The process for resolving remote conflict is terminated at S908.

Figures 8, 9:
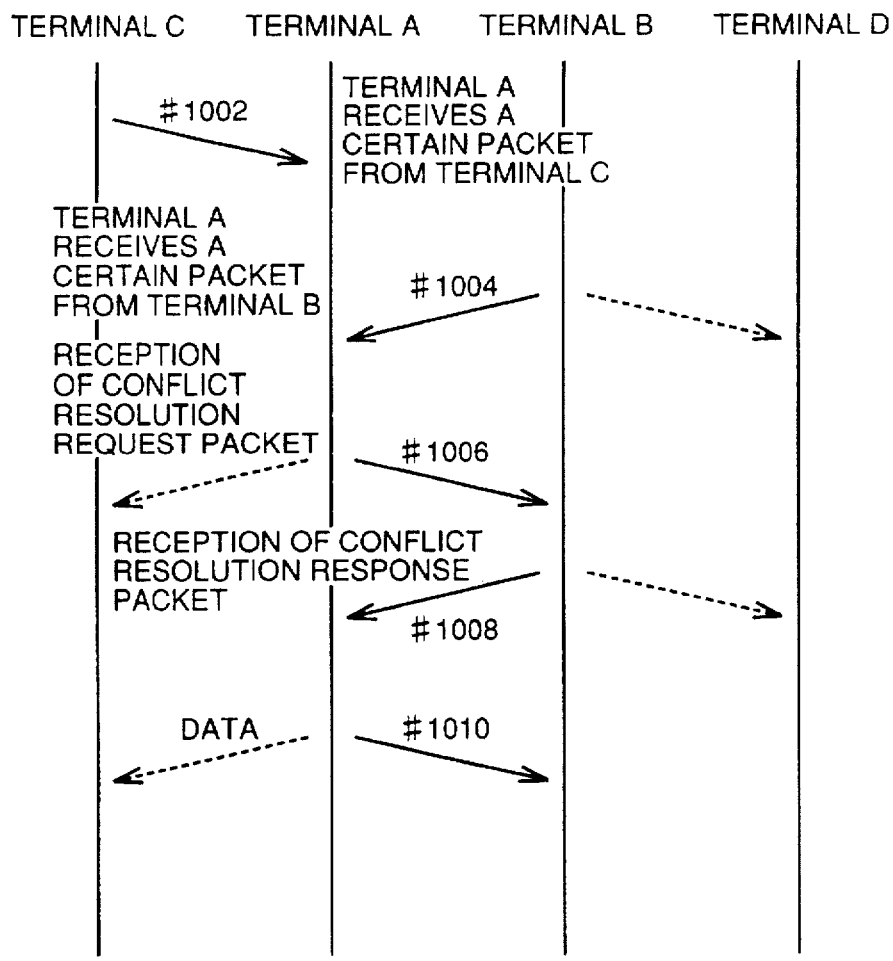
FIG. 8 shows an example of resolution of conflict between terminals B and C having conflict in address in accordance with the first embodiment of the present invention.
FIG. 9 shows an example of an address table of the radio terminal in accordance with the first embodiment of the present invention.

FIG. 8 shows an example of resolving conflict between terminals B and C having the conflicting address.

Referring to FIG. 8, when terminal A receives a packet of terminal C to update its address table (#1002) and receives a packet of terminal B to update the address table (#1004), terminal A checks the address table to detect the presence of two terminals having the conflicting address from the fact that terminals B and C have the same address and different epoch numbers. Terminal A sets the conflict flag for the address of terminals B and C in the address table of its own to register the presence of a plurality of terminals corresponding to that address.

FIG. 9 shows an example of setting information of terminals B and C in address table 1110 when the conflict flag is set in resolving conflict as shown in FIG. 8.

Referring to FIG. 9, an address column 1102 of terminal B in address table indicates the epoch number of terminal B, the conflict flag, and the time when the address of terminal B is last updated. An address column 1104 of terminal C indicates the epoch number of terminal C, the conflict flag, and the time when the address of terminal C is last updated.

In requesting resolution of address conflict, a conflict resolution request packet is transmitted. The timing to transmit the conflict resolution request packet includes, for example, the following two cases.

First, resolution of address conflict is requested by transmitting a conflict resolution request packet to a destination terminal when one terminal transmits a packet to another.

Figure 10:
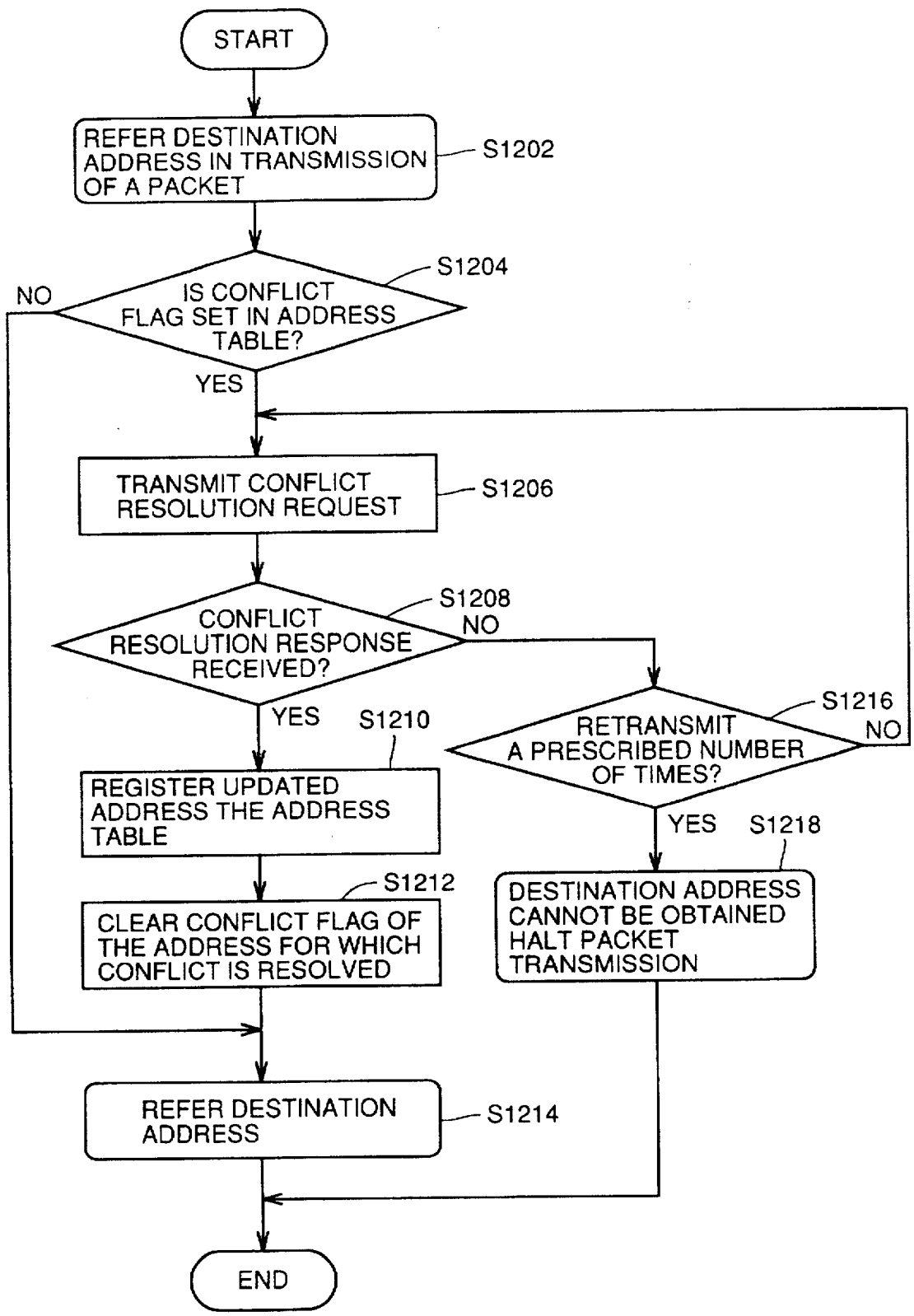
FIG. 10 is a flow chart showing operation for requesting resolution of address conflict to a destination terminal in receiving a packet at the radio terminal in accordance with the first embodiment of the present invention.

FIG. 10 is a flow chart showing operation of one terminal requesting resolution of address conflict to a destination terminal.

Referring to FIG. 10, a destination address registered in the address table of the terminal of interest is referred at S1202 in transmitting a packet. Determination is made at S1204 whether or not the conflict flag is set for the sender's address at the address table. If the conflict flag is not set, no conflict is generated for the destination address, and therefore the process for resolving address conflict is terminated at S1214.

If conflict flag is set at S1204, a conflict resolution request packet is transmitted to the destination terminal at S1206. At S1208, determination is made whether a conflict resolution response packet is received from the destination terminal. If reception of the conflict resolution response packet is determined, an updated address is registered as the address of the destination terminal in the address table of the terminal of interest at S1210. The conflict flag for the address for which conflict is resolved is cleared at S1212, and the conflict resolution process is terminated at S1214. A packet is transmitted with the updated address as a destination address.

If it is determined that a conflict resolution response packet is not received at S1208, whether or not a conflict resolution request packet is retransmitted a prescribed number of times is determined at S1216. If retransmission of the conflict resolution request packet is determined, the process returns to S1206 to transmit the conflict resolution request packet again to the destination terminal, performing the operation as described above.

If it is determined at S1216 that a conflict resolution request packet is not transmitted again, at S1218 transmission of the conflict resolution request packet is halted and operation is terminated, giving up gaining the destination address.

When terminal A transmits a certain packet to terminal B in FIG. 8, resolution of address conflict is requested to destination terminal B in accordance with the flow chart shown in FIG. 10 described above.

Terminal A finds out, during transmission of the packet, the presence of terminal C having the address same as the address of terminal B by checking the conflict flag of the address table of its own. Here, terminal A transmits a conflict resolution request packet to terminal B (#1006). The conflict resolution request packet same as that for terminal B is transmitted also to terminal C which is at a communicable distance from terminal A.

While terminal A selects terminal B, to which data must be transmitted, from terminals B and C as the destination of the conflict resolution request packet in the example shown in FIG. 8, there is no need to specify one. The conflict resolution request packet requests the destination terminal to change the address.

Terminal B updates the address of its own if the received packet is a conflict resolution request packet, and informs the requesting terminal A of the address with a conflict resolution response packet (#1008). The conflict resolution response packet informs other terminals of the updated address. Terminal A transmits the conflict resolution request packet a plurality of times to terminal B until reception of the response, and, when the response is received, updates the address of terminal B in the address table and clears the conflict flag registered in the address table for terminals B and C for which address conflict is resolved.

After address conflict is resolved, data can be communicated between terminal A and terminals B and C (#1010).

This method reduces the likelihood that a plurality of terminals detecting remote conflict transmit a conflict resolution request packet simultaneously to cause jam in the network.

In accordance with a second method, a conflict resolution request packet is transmitted immediately after remote conflict is detected. In accordance with this method, use of a conflicting address is less likely, since remote conflict is resolved as soon as possible after it is generated.

If a packet transmitted from an address for which conflict is detected is received, the packet is received as a valid packet by identifying the sending terminal from combination of the address and the epoch number or all such packets are discarded until address conflict is resolved. The former approach is suitable for a first case where transmission of a conflict resolution request packet is delayed, and the latter is suitable for a second case where a conflict resolution request packet is transmitted immediately after conflict is detected and reception of a packet transmitted from a terminal with the conflicting address is less likely.

In the format of the conflict resolution request packet shown in FIG. 4D, packet type 407 indicates that the packet is a conflict resolution request packet. Data 409 indicates the epoch number of the destination terminal.

In the format of the conflict resolution response packet shown in FIG. 4E, packet type 407 indicates that the packet is a conflict resolution response packet.

[Second Embodiment]

In the second embodiment, communication protocol is added in which an epoch number used for checking address conflict is set based on a random number so that a value not conflicting with epoch numbers of other terminals in the communication range of the terminal of interest is selected and used.

Epoch numbers are set before addresses of respective terminals are set. In order to set an epoch number, each terminal collects epoch numbers of sending terminals included in received packets and has a table (history table) for maintaining a plurality of epoch numbers received recently. In the history table, epoch numbers which are currently used or have been used in the radio network are stored.

Figure 11:
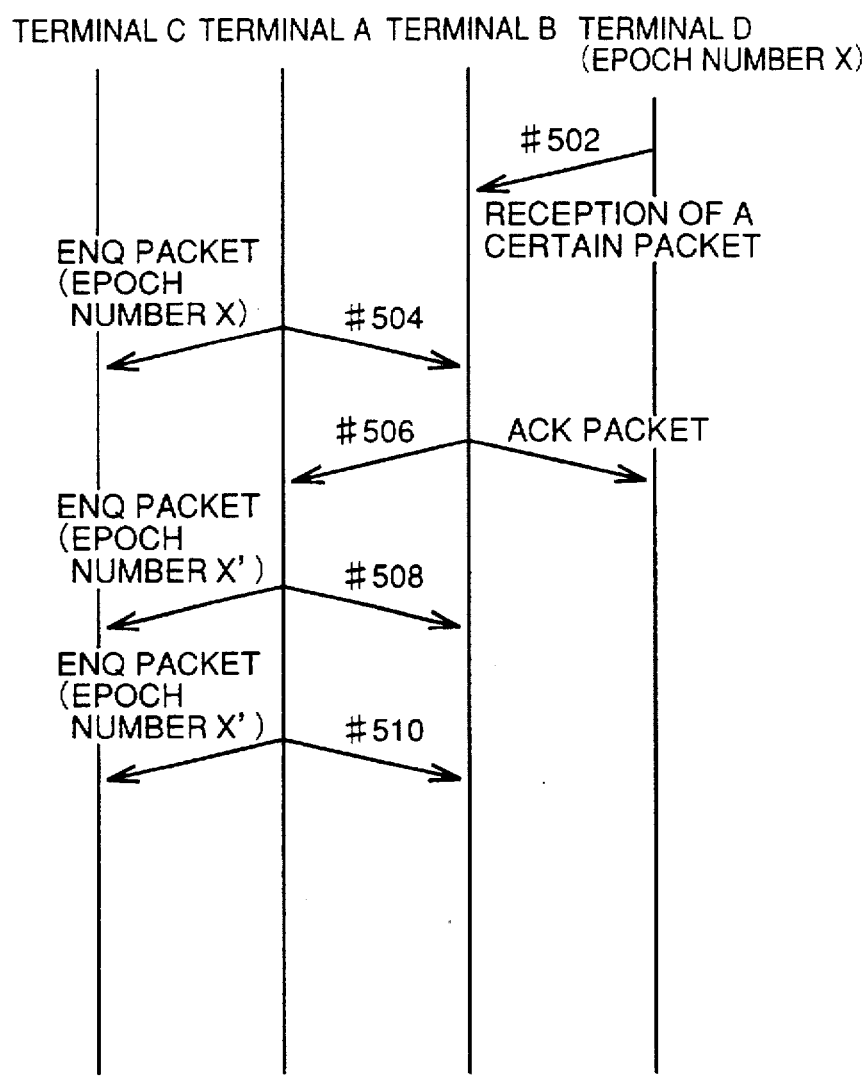
FIG. 11 shows an example where terminal A gains a new epoch number in accordance with a second embodiment of the present invention.

FIG. 11 shows the process in which terminal A gains an epoch number.

Figure 12:
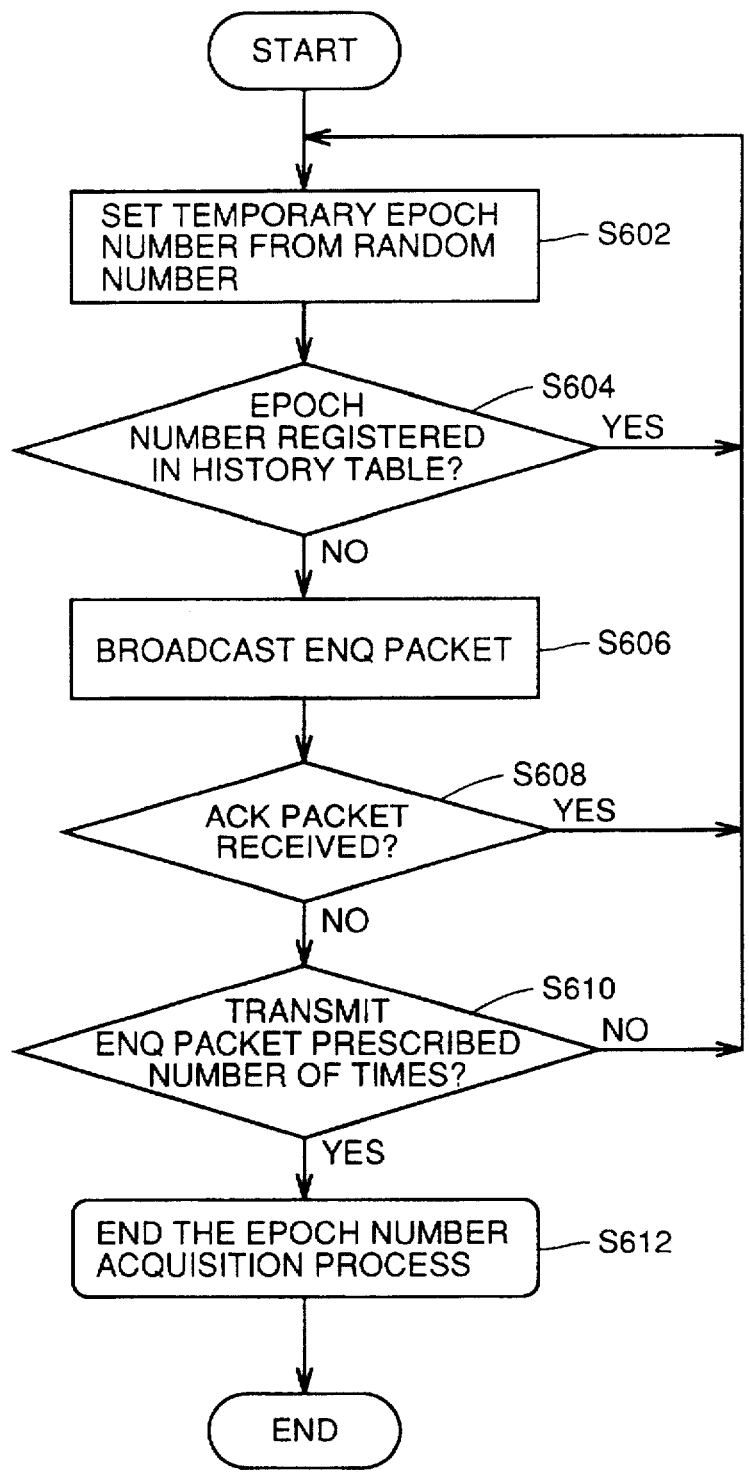
FIG. 12 is a flow chart showing the process for gaining an epoch number at the radio terminal in accordance with the second embodiment of the present invention.

FIG. 12 is a flow chart showing the process for gaining an epoch number of a terminal.

Referring to FIG. 11, it is assumed that each of terminals B, C and D already in operation has transmitted and received packets for communication with other terminals before terminal A initiates communication operation. Each terminal obtains from the received packet the epoch number of the sending terminal included in the packet and adds the number to the history table of its own. For example, if terminal B receives a packet from terminal D, terminal B adds epoch number X of terminal D to the history table of its own (#502).

Description will be made with reference to the flow chart of FIG. 12 of an example where terminal A sets an epoch number under the conditions described above.

Referring to FIG. 12, terminal A produces a temporary epoch number based on a random number at S602. It is now assumed that the temporary epoch number thus produced is X, same as the epoch number of terminal D.

At S604, terminal A determines whether the temporary epoch number X is registered in the history table of terminal A. When it determines the temporary epoch number X is registered in the history table, the process returns to S602 because epoch number X has been already used by another terminal D, and terminal A generates an epoch number again. If the temporary epoch number X is not registered as an epoch number of another terminal in the history table of terminal A at S604, terminal A transmits an ENQ packet including epoch number X to all the other terminals B and C at S606 (#504).

The ENQ packet serves to enquire to other terminals if a temporary epoch number produced by the terminal of interest is used or not.

In the format of the ENQ packet shown in FIG. 4F, "FFFF" in destination address 401 indicates a broadcast address. "FFFF" of sender's address 403 indicates that an address of the terminal of interest has not been determined yet. Sender's epoch number 405 indicates an epoch number for which enquiry is made. Packet table 407 indicates that the packet is an ENQ packet.

After obtaining an epoch number different from the epoch numbers in the history table of its own, each terminal transmits an ENQ packet to the other terminals in the radio network.

Terminals B and C succeeded in receiving the ENQ packet transmitted by terminal A take out the temporary epoch number X from the ENQ packet, and compare the number with the epoch numbers of terminals B and C and the epoch numbers held in the history tables of their own.

If the same epoch number is present in the history table, an ACK packet is transmitted to the radio network.

The ACK packet serves to report that the epoch number for which an enquiry is made by the ENQ packet has been used already.

In the format of the ACK packet shown in FIG. 4G, "FFFF" of destination address 401 indicates a broadcast address. Packet type 407 indicates that the packet is an ACK packet.

It is to be noted that, even though the ENQ packet transmitted by terminal A does not reach terminal D, terminal B can inform terminal A with the ACK packet that epoch number X has been used already by terminal D because epoch number X of terminal D is registered in the history table of terminal B as a result of past communication (#506). When terminal A receives the ACK packet at S608, terminal A produces a temporary epoch number X' again and repeats transmission of an ENQ packet to other terminals (#508, 510).

If terminal A which has transmitted the ENQ packet does not receive an ACK packet, terminal A assumes that epoch number X' is a value not conflicting with epoch numbers of other terminals in the communicable range of terminal A. Terminal A transmits ENQ packets a plurality of times at a prescribed interval at S610. If no ACK packet is received as a result of such transmissions, the epoch number is determined as valid at S612 and epoch number X' is used as the epoch number of terminal A. This completes the epoch number acquisition process.

Since ENQ packets and ACK packets might be lost due to error in data transmission or the like, conflict of the epoch number becomes less likely as the number of times an ENQ packet is transmitted is greater, contributing to high reliability.

As described above, use of the history table allows to ensure that the epoch number does not conflict with those of other terminals in a range wider than direct communicable range of terminal A.

Storage of the greater number of epoch numbers in the history table enables setting of an epoch number less likely to conflict with those of the other terminals. However, if the greater number of epoch numbers are thus stored, an epoch number of the terminal which has been stopped operation may also be held. Therefore, the number of epoch numbers to be stored in the history table is changed in accordance with the communication environment such as movement of terminals, communicable distance of terminals, and the required level of reliability.

Figure 13:
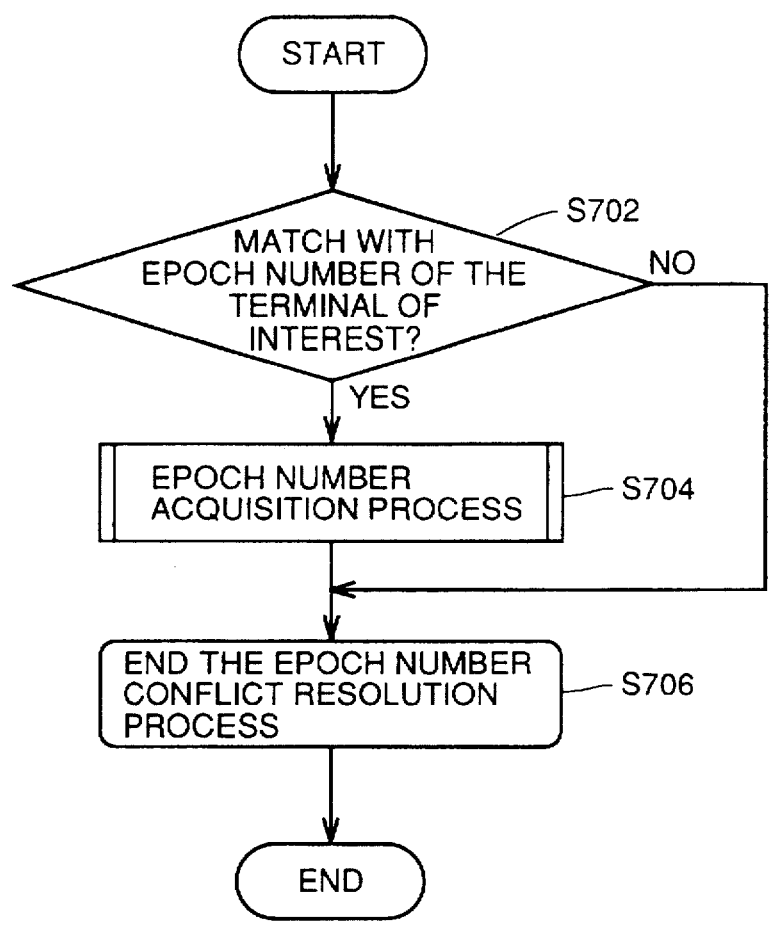
FIG. 13 is a flow chart showing the process for resolving epoch number conflict after the epoch number is set at the radio terminal in accordance with the second embodiment of the present invention.

FIG. 13 is a flow chart showing the process for resolving conflict of the already set epoch number of a terminal.

Conflict of the already set epoch number of a terminal in operation can be detected by comparison made by the terminal of interest between the epoch number of its own and the epoch number of the sending terminal included in the received packet.

Referring to FIG. 13, determination is made as to whether or not the epoch number of the sending terminal in the received packet matches with the epoch number of the terminal of interest at S702. If the epoch numbers match and conflict of epoch numbers is detected, the epoch number of the terminal of interest is reset at S704 in accordance with the process similar to that shown in FIG. 12, and the process for resolving conflict of epoch numbers is terminated at S706. If epoch numbers do not match at S702, no conflict of epoch numbers is generated and the process for resolving conflict of epoch numbers is terminated at S706.

After the epoch number is set, setting of an address for each terminal is initiated. The address of each terminal is set similarly to the first embodiment described above.

Although generation of packets for setting epoch numbers gives some influence to the radio network when each terminal has its inherent epoch number only within the communication range where epoch numbers are variable as in the second embodiment, the need for employing information depending on particular equipments such as manufacturing number is eliminated. Meanwhile, when each terminal has its inherent epoch number as in the first embodiment, address conflict can be surely detected since the epoch number is always uniquely determined for the terminal. However, this approach has a disadvantage that the steps in the manufacturing process are increased in number because special operation is required for input of epoch numbers by the user.

Figure 14:
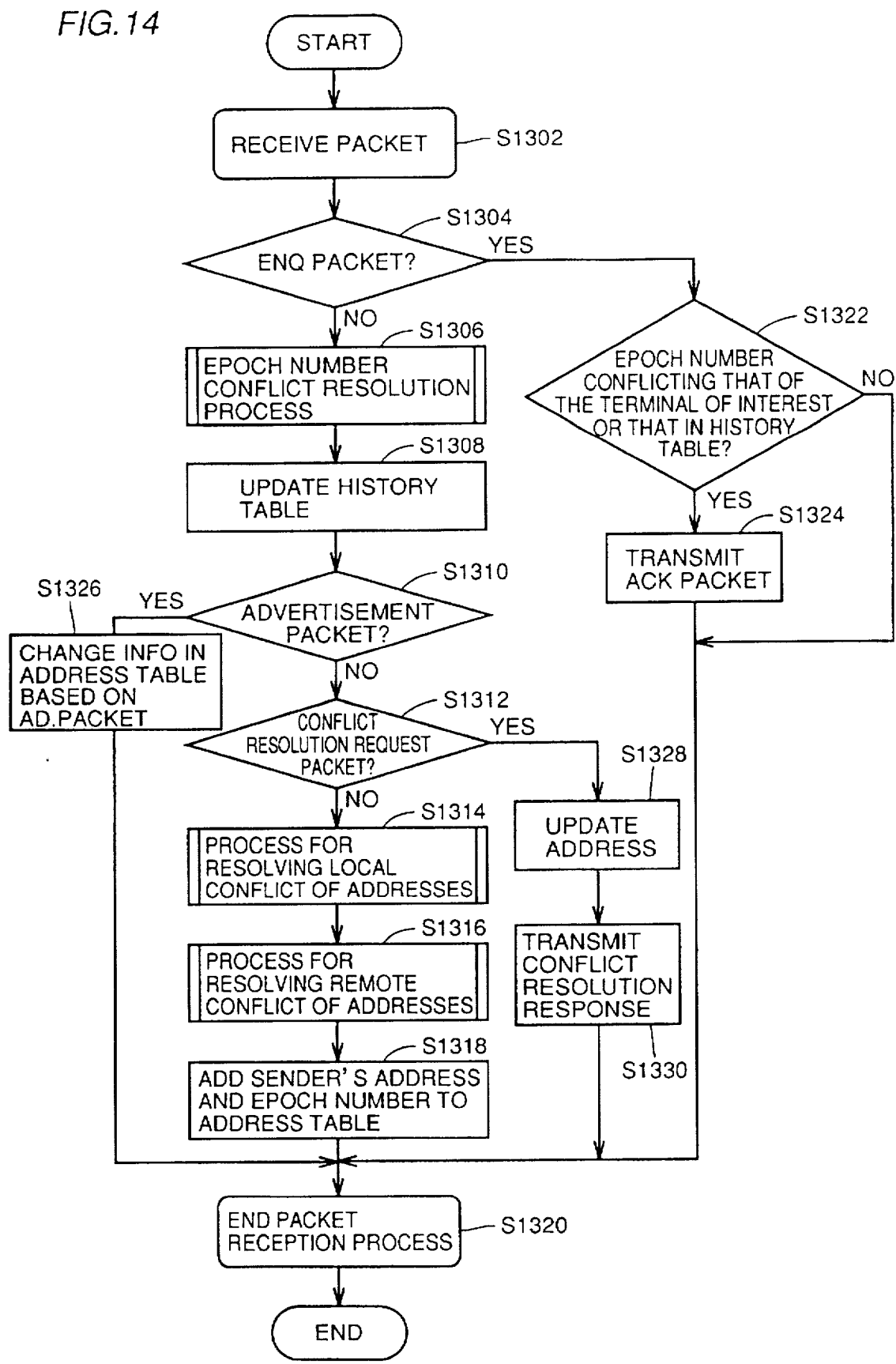
FIG. 14 is a flow chart showing a sequence of processes related to the packet received at the radio terminal in accordance with the second embodiment of the present invention.
Figure 15:
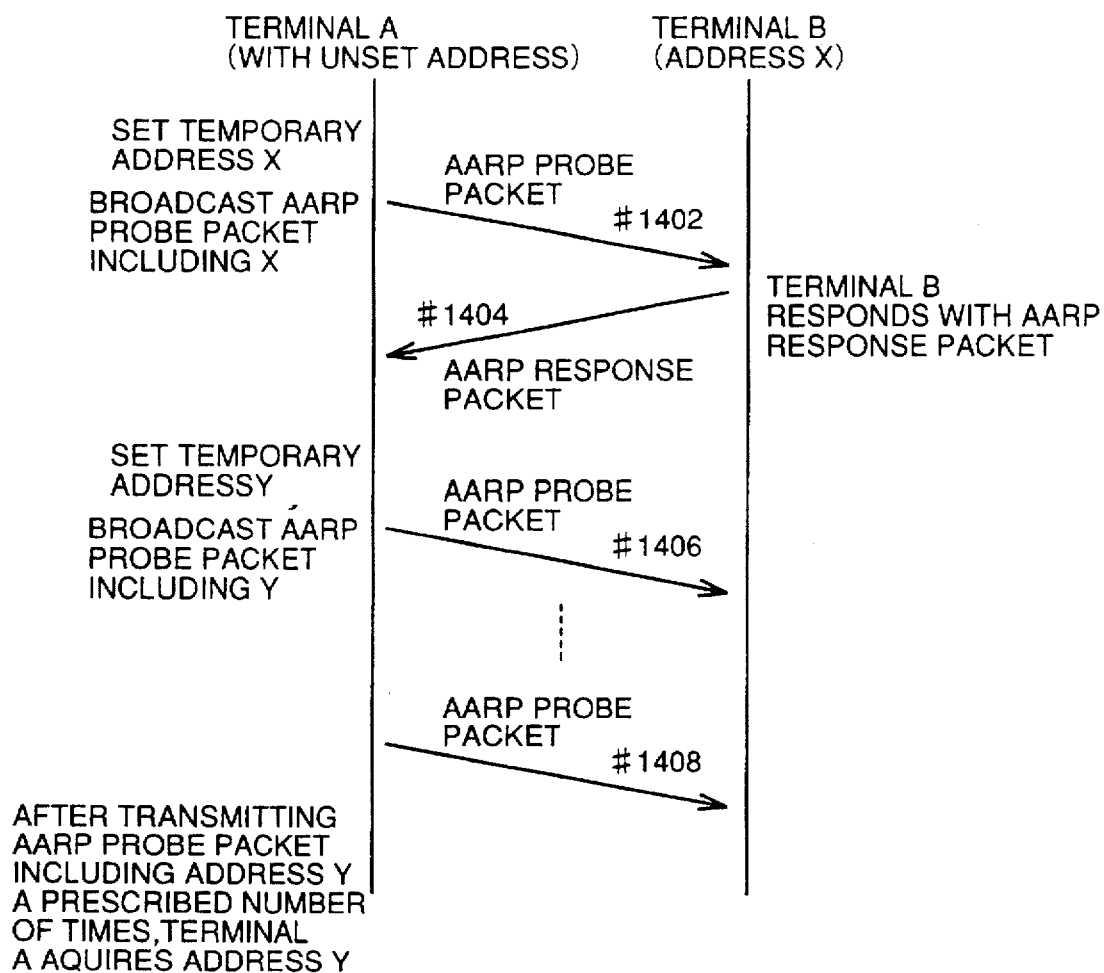
FIG. 15 describes a conventional dynamic address allocation in a cable network.

FIG. 14 is a flow chart showing a sequence of processing related to a received packet of a radio terminal in accordance with the embodiment of the present invention.

Referring to FIG. 14, when a packet is received from a certain terminal at S1302, determination is made whether the packet is an ENQ packet or not at S1304. If the packet is determined as an ENQ packet, determination is made whether the epoch number included in the ENQ packet conflicts with the epoch number of the terminal of interest at S1322. If it is determined that the epoch number conflicts therewith, an ACK packet is transmitted at S1324 to the terminal which has sent the ENQ packet, and the packet receiving process is completed at S1320.

If it is determined that epoch number does not conflict therewith at S1322, the packet receiving process is then completed at S1320 without any additional steps.

If it is determined that the received packet is not an ENQ packet at S1304, the process for resolving conflict of epoch numbers shown in FIG. 7 is carried out at S1306. When a new epoch number is obtained and the process for resolving conflict is terminated at S1306, the history table is updated at S1308.

Subsequently, determination is made whether the packet received at S1302 is an advertisement packet or not at S1310. If the packet is determined as an advertisement packet, the information of the address table is changed based on the advertisement packet at S1326, and the packet receiving process is completed at S1320.

If it is determined at S1310 that the packet received at S1302 is not an advertisement packet, determination is made at S1312 whether the packet is a conflict resolution request packet or not. If it is determined as the conflict resolution request packet, the address is updated at S1328, and a conflict resolution response packet is transmitted at S1330 to the terminal which has sent the conflict resolution request packet. The packet receiving process is completed at S1320.

If it is determined at S1312 that the packet received at S1302 is not a conflict resolution request packet, the process for resolving remote conflict of address as shown in FIG. 8 is carried out at S1314. Next, the process for resolving remote conflict of the addresses as shown in FIG. 9 is carried out at S1316. A pair of the epoch number and the address of the sending terminal is added to the addresses table at S1318, and the packet receiving process is completed at S1320.

While the conflict resolution request packet is transmitted from terminal A to terminal B in the present embodiment, the packet can be transmitted to terminals B and C to request response from respective terminals.

If transmission is made designating either one terminal, the destination terminal is designated by combination of the address and the epoch number of the destination terminal.

As described above, dynamic address allocation can be implemented which always allows easy detection and resolution of address conflict by each terminal within its communicable range between the radio terminals subjected to limitation of communication distance, fluctuation in electric waves over time, and movement of terminals in the radio local area network.

Therefore, a radio terminal and address allocation method thereof capable of resolving address conflict between radio terminals can be applied in the radio local area network. In addition, a special organization for collectively managing addresses of all the terminals is not required. Since a free address is selected and used in the communicable range, depletion of address resources can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An address allocation method in a radio network including a plurality of radio terminals which have changeable first and second identifiers, comprising, in each radio terminal, the steps of:

setting a first identifier of a current terminal;

receiving a pair of first and second identifiers of a communicating terminal therefrom during communication;

comparing the pair of first and second identifiers of said communicating terminal with a pair of first and second identifiers of the current terminal and a pair of first and second identifiers of another terminal already held in the current terminal;

detecting conflict of first identifiers between the compared pairs of first and second identifiers; and resetting the first identifier, for which conflict is detected, of either one terminal.

2. The address allocation method according to claim 1, further comprising, in each radio terminal, the steps of:

informing the communicating terminal of the first and second identifiers of the current terminal during communication; and storing and holding the first and second identifiers of the communicating terminal as a pair.

3. The address allocation method according to claim 1 or 2, wherein said second identifier is changeable, and said method further comprises, in each radio terminal, the steps of:

setting a second identifier of the current terminal;

informing another terminal of the second identifier of the current terminal;

receiving information of a second identifier from said another terminal;

comparing the second identifier of the current terminal and the second identifier received from said another terminal;

detecting conflict of the compared second identifiers; and resetting the second identifier of the current terminal for which conflict is detected.

4. The address allocation method according to claim 1 or 2, wherein said first identifier is an address and said second identifier is an epoch number.

5. A radio terminal having changeable first and second identifiers and used in a radio network, comprising:

setting means for setting a first identifier of a current terminal;

first receiving means for receiving a pair of first and second identifiers of a communicating terminal therefrom during communication;

first comparing means for comparing the pair of first and second identifiers of said communicating terminal received by said first receiving means with a pair of first and second identifiers of the current terminal and a pair of first and second identifiers of another terminal already held in the current terminal;

first detecting means for detecting conflict of the first identifiers between the pairs of first and second identifiers compared by said first comparing means; and first resetting means for resetting the first identifier, for which conflict is detected, of either one terminal.

6. The radio terminal according to claim 5, further comprising:

first informing means for informing the communicating terminal of the pair of first and second identifiers of the current terminal; and holding means for storing and holding the pair of first and second identifiers of said communicating terminal as a pair.

7. The radio terminal according to claim 5 or 6, wherein said second identifier is changeable, and said terminal further comprises:

second setting means for setting a second identifier of the current terminals;

second informing means for informing another terminal of the second identifier of the current terminal;

second receiving means for receiving a second identifier informed by said another terminal;

second comparing means for comparing the second identifier of the current terminal and the second identifier received from said another terminal by said second receiving means;

second detecting means for detecting conflict of the second identifiers compared by said second comparing means; and second resetting means for resetting the second identifier of the current terminal for which conflict is detected by said second detecting means.

8. The radio terminal according to claim 5 or 6, wherein said first identifier is an address and said second identifier is an epoch number.

9. A radio network including a plurality of radio terminals which have changeable first and second identifiers, comprising in each radio terminal;

first setting means for setting a first identifier of a current terminal;

first informing means for informing a communicating terminal of a pair of first and second identifiers of the current terminal during communication;

first receiving means for receiving a pair of first and second identifiers of the communicating terminal therefrom during communication;

first holding means for storing and holding the first identifier of said communicating terminal;

second holding means for storing and holding the received second identifier of said communicating terminal;

first comparing means for comparing the received pair of first and second identifiers of said communicating terminal and the pair of first and second identifiers of the current terminal and a pair of first and second identifiers of another terminal already held in the current terminal;

first detecting means for detecting conflict of the first identifiers between the pairs of first and second identifiers compared by said first comparing means; and first resetting means for resetting the first identifier, for which conflict is detected by said first detecting means, of either one terminal.

10. The radio network according to claim 9, wherein said second identifier is changeable, and in each radio terminal said network further comprises:

second setting means for setting a second identifier of the current terminal;

second informing means for informing of another terminal the second identifier of the current terminal;

second receiving means for receiving a second identifier informed by another terminal by said second informing means;

second comparing means for comparing the second identifier received from said another terminal by said second receiving means and the second identifier of the current terminal;

second detecting means for detecting conflict of the second identifiers compared by said second comparing means; and second resetting means for resetting the second identifier of the current terminal for which conflict is detected by said second detecting means.

11. The radio network according to claim 9 or 10, wherein said first identifier is an address and said second identifier is an epoch number.

\* \* \* \* \*